United States Patent [19]
Eberspacher

[11] Patent Number: 6,039,377
[45] Date of Patent: *Mar. 21, 2000

[54] PORTABLE EMERGENCY CARE FACILITY

[76] Inventor: Charles H. Eberspacher, 2 NW. 61st Ter., Gladstone, Mo. 64188

[ * ] Notice: This patent is subject to a terminal disclaimer.

[21] Appl. No.: 09/110,211

[22] Filed: Jul. 6, 1998

Related U.S. Application Data

[63] Continuation-in-part of application No. 08/650,467, May 20, 1996, Pat. No. 5,775,758.

[51] Int. Cl.$^7$ .................................. B60P 3/14; A61G 3/00
[52] U.S. Cl. ............................................... 296/24.1; 296/19
[58] Field of Search .............................. 296/19, 24.1, 1.1

[56] References Cited

U.S. PATENT DOCUMENTS

| | | |
|---|---|---|
| 3,118,187 | 1/1964 | Alimanestiano . |
| 3,694,023 | 9/1972 | Burgess .................... 296/24.1 |
| 4,181,347 | 1/1980 | Clark ......................... 296/19 |
| 4,210,355 | 7/1980 | Legeau ....................... 296/19 |
| 4,339,146 | 7/1982 | Lehmann .................... 296/19 |
| 4,425,978 | 1/1984 | Star ........................ 296/19 X |
| 4,449,749 | 5/1984 | Clark ....................... 296/24.1 |
| 4,712,822 | 12/1987 | Janos et al. .............. 296/24.1 |
| 4,915,435 | 4/1990 | Levine ..................... 296/24.1 |
| 5,236,390 | 8/1993 | Young ..................... 296/24.1 |
| 5,398,986 | 3/1995 | Koob ....................... 296/24.1 |

FOREIGN PATENT DOCUMENTS

| | | | |
|---|---|---|---|
| 656253 | 5/1929 | France ....................... 296/19 |

*Primary Examiner*—Joseph D. Pape
*Attorney, Agent, or Firm*—Armstrong Teasdale LLP

[57] ABSTRACT

A portable emergency care facility having an elongate enclosure having first and second ends and two opposing long walls extending between the first and second ends. There are a plurality of wheels on the enclosure to facilitate transporting the facility. Inside the enclosure are a plurality of treatment tables extending from one of the long walls toward the center of the enclosure, each of the treatment tables being sufficiently spaced from the others to allow patient access on both sides of the treatment tables, and being separated by a movable privacy curtain. A ceiling-mounted surgical light is provided over at least one of the treatment tables. There is an access opening in each end of the enclosure, and an air curtain at each access opening. An oxygen source, and a manifold and piping system extending through the wall adjacent the treatment tables, with an outlet adjacent each treatment table. A vacuum pump for generating suction, and a manifold and piping system extending through the wall adjacent the treatment tables, with an outlet adjacent each treatment table.

4 Claims, 6 Drawing Sheets

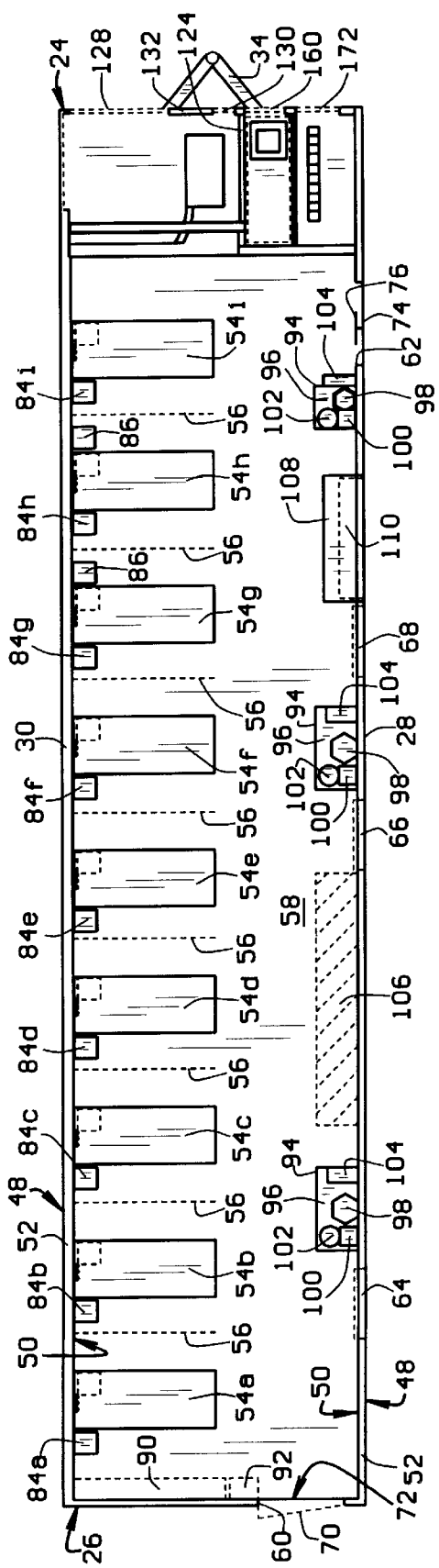
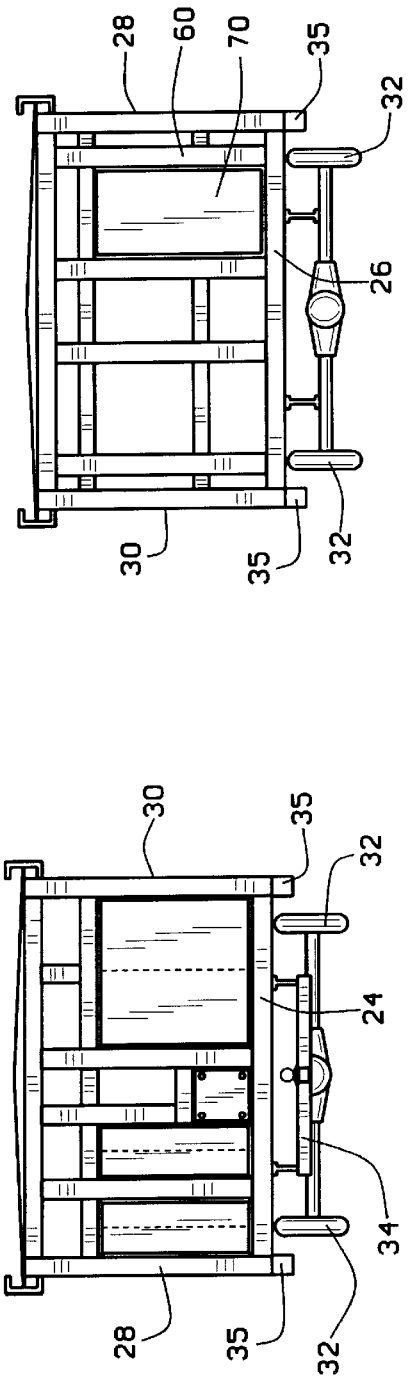

PORTABLE EMERGENCY CARE FACILITY

This is a continuation-in-part of application Ser. No. 08/650,467, filed May 20, 1996, now U.S. Pat. No. 5,775,758, issued Jul. 7, 1998.

FIELD OF THE INVENTION

This invention relates generally to portable emergency equipment, and more particularly to a portable emergency care facility.

BACKGROUND OF THE INVENTION

There are many situations where it is desirable to temporarily set up an emergency-room type health care facility, for example in the aftermath of a natural disaster where the number of sick and injured exceeds the capacity of existing local emergency room facilities. While emergency transportation vehicles such as ambulances are available to provide facilities for emergency treatment, known ambulances are typically intended for transporting, rather than treating patients, and usually can only accommodate one or two patients. Moreover, these ambulances typically do not provide sufficient room or access to the patient for the delivery of extended emergency care. Particularly after natural disasters such as earthquakes, tornadoes and hurricanes when large numbers of people are injured, a need exists for larger, better-equipped portable emergency care facilities which can provide sophisticated emergency care to multiple patients at one time.

It would be desirable to provide a portable emergency care facility which can accommodate multiple patients at one time. It would be further desirable to provide such a facility with ample access space around each patient to facilitate the delivery of emergency care. It would be still further desirable to provide such a facility with a power supply, water supply so that the facility is substantially self-sufficient. It would also be desirable to provide such a facility which may be transported for temporary use at an emergency site, which may later be removed and stored until needed again.

SUMMARY OF THE INVENTION

These and other objects may be attained by a portable emergency care facility which is readily transportable on the ground or by air, and thus can be brought to the patients, rather than requiring the patients to be transported to a distant facility. The portable emergency care facility provides a self-contained, self-sufficient facility for the delivery of emergency care for a plurality of patients. In one embodiment, the portable emergency care facility includes an elongate wheeled enclosure with first and second walls at first and second opposing ends. The enclosure includes two opposing long walls running the length of the enclosure and between the first and second ends. A plurality of treatment tables extend generally perpendicularly from one of the long walls, spaced from each other to provide access to a patient on both sides of each treatment table. The treatment tables are separated by privacy curtains hanging between the treatment tables. An access passage extends substantially the length of the enclosure, along the long wall opposing the wall from which the treatment tables extend. The first and second ends of the enclosure each include a doorway having a door and, in one embodiment, an air curtain to protect the interior of the enclosure when the doors are open. The portable emergency care facility further includes medical equipment such as surgical lights, anaesthetic equipment, and patient monitors, and a diesel-powered electric generator for providing electric power inside the enclosure for operating the medical equipment. The facility further includes an oxygen supply, a compressed air supply, and a suction line. In addition, the facility includes a water supply having gravity-fed water tanks and a removable collection tank for collecting waste water for disposal.

The portable emergency care facility may be towed or air-lifted to an emergency site as needed, set up with a minimum of preparation, and used for the delivery of emergency care, including surgery. The portable emergency care facility is self-sufficient, providing its own electrical power, water supply, and climate control. In contrast to known ambulances, the portable emergency care facility can be used simultaneously for a plurality of patients, and may be used for emergency surgeries. When the emergency is over, the portable emergency care facility can be removed from the site and stored until needed again.

BRIEF DESCRIPTION OF THE DRAWINGS

FIG. 4 is a top plan view of the portable emergency care facility.

FIG. 5 is a rear end elevational view of the portable emergency care facility.

FIG. 6 is a front end elevational view of the portable emergency care facility.

DETAILED DESCRIPTION

Figure 1:
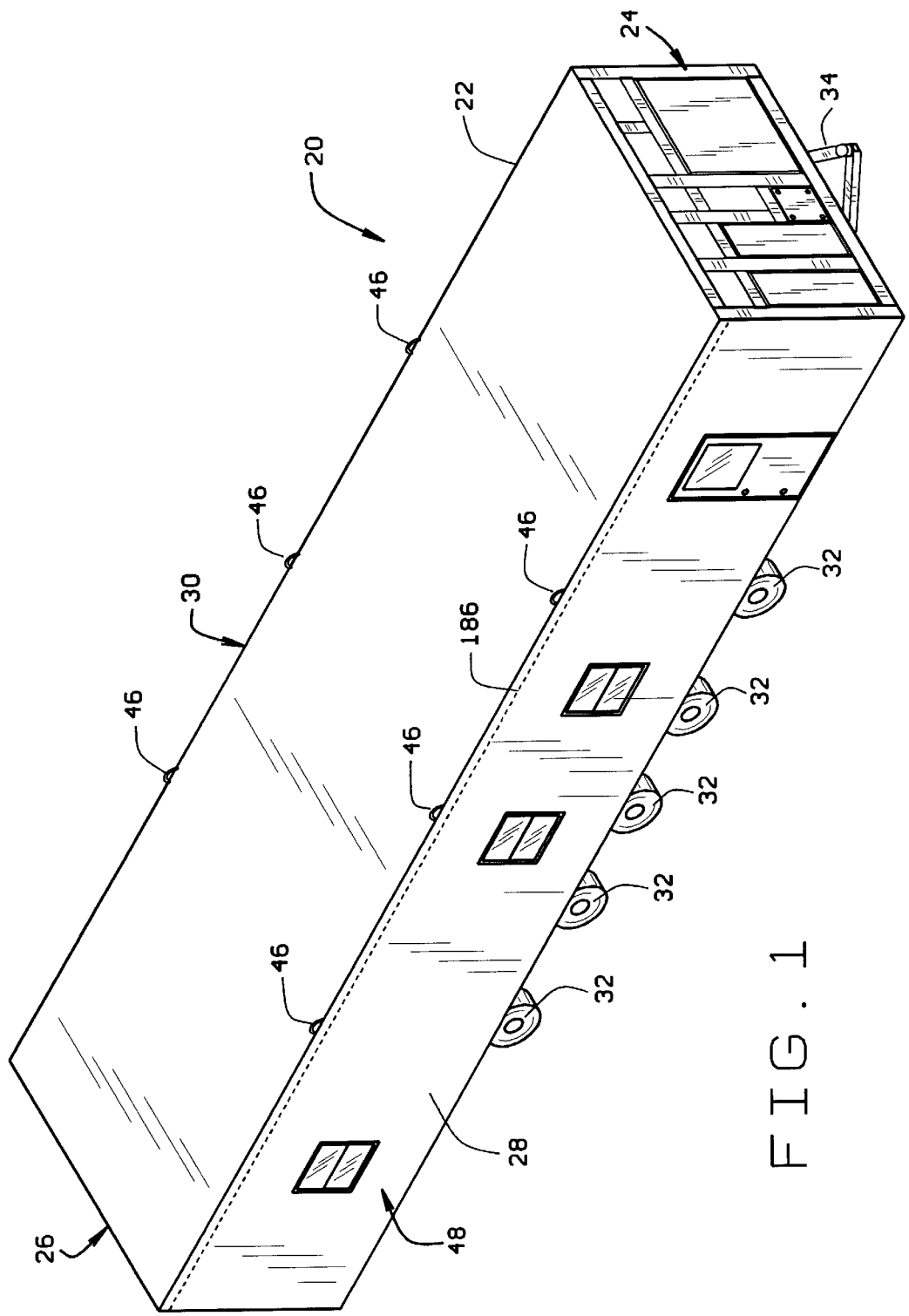
FIG. 1 is a perspective view of a portable emergency care facility.
Figure 2:
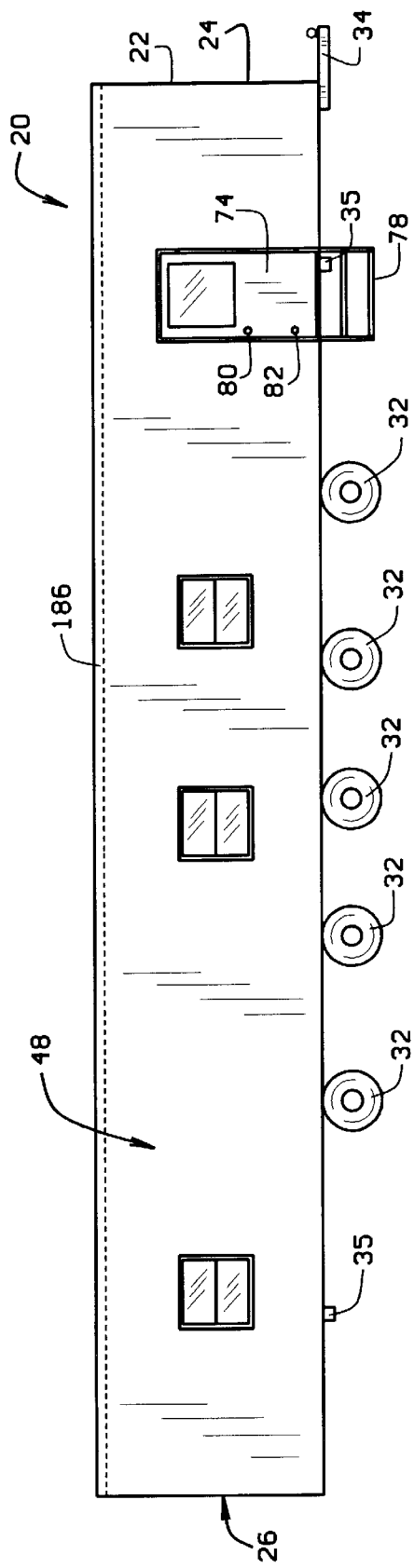
FIG. 2 is a left side elevational view of the portable emergency care facility.

FIG. 1 is a perspective view of a portable emergency care facility 20. Facility 20 includes an elongate wheeled enclosure 22 having a first end 24 and a second end 26, which form respectively the front and back of the enclosure. Two opposing long walls 28 and 30 extend between first end 24 and second end 26, and form respectively the left and right sides enclosure 22. A plurality of wheels 32 are mounted on the underside of enclosure 22 to facilitate transporting facility 20. A hitch 34 extends from front end 24 so that facility 20 may be coupled to another vehicle and towed. An extendable landing gear 35 (shown in FIG. 2) is mounted on facility 20, to contact the ground and stabilize and level facility 20 at an emergency site. In one embodiment, landing gear 35 includes multiple, telescoping elongate members which are pivotally mounted to facility 20 and can be extended and adjusted in position relative to facility 20.

Figure 3:
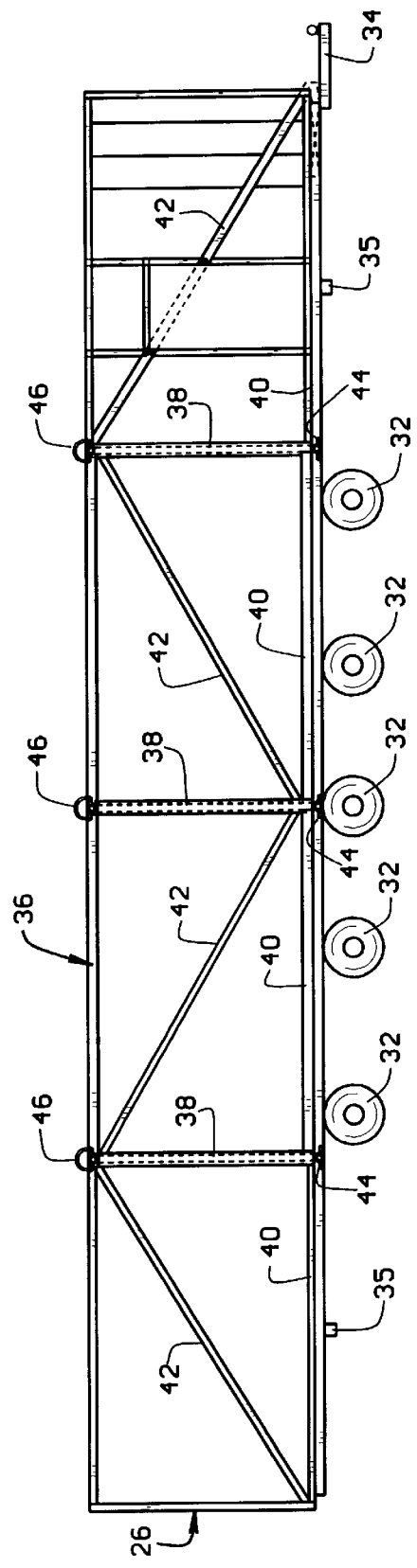
FIG. 3 is a left side cross-sectional view of the portable emergency care facility.

FIG. 3 a left side cross-sectional view of the portable emergency care facility showing enclosure 22 including a rigid frame 36 having a plurality of vertical posts, 38, longitudinal beams 40, diagonal cross-members 42, and transverse horizontal beams 44 so that facility 20 is sufficiently strong to withstand being airlifted to an emergency site. In one embodiment, a plurality of rigid eyelets 46 are secured to some of vertical posts 38 so that lines for airlifting may be attached to facility 20. Frame 36 is covered with an exterior skin 48, which is fabricated from, for example, thin aluminum sheet. Frame 36 may be further covered with an interior skin 50 fabricated from thin aluminum sheet, a polymer sheet material such as Formica®, or another suitable material. A space formed between exterior skin 48 and interior skin 50 is filled with insulation 52, such as fiberglass batting or styrofoam sheets.

Figure 4A:
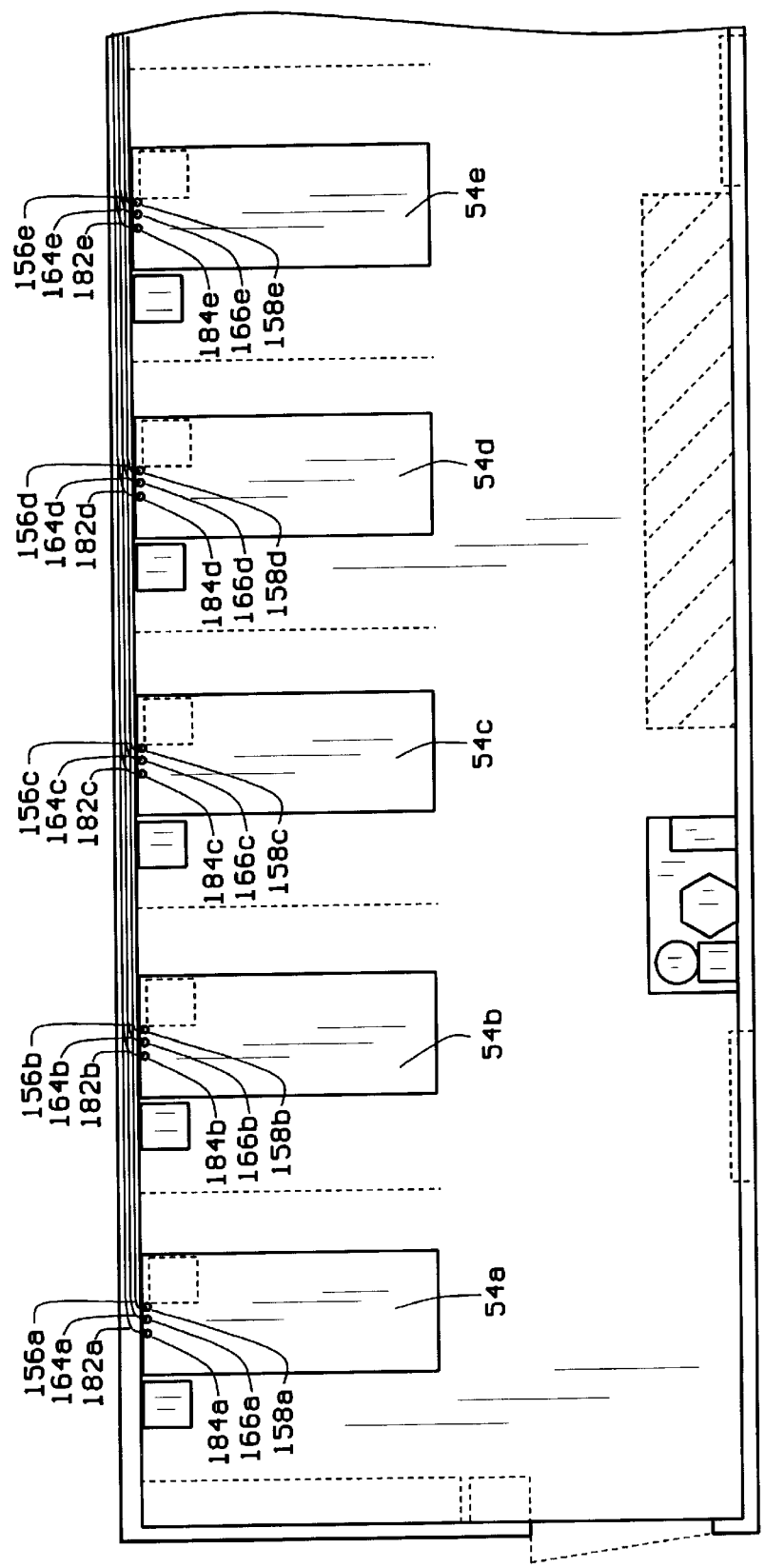
FIG. 4A is a top plan view of a rear portion of the portable meregncy care facility.

FIG. 4 is a top plan view of the portable emergency care facility which shows the unique layout of the interior of enclosure 22. A plurality of treatment tables 54a–54i extend generally perpendicularly from one of the long walls 28 or 30. In one embodiment, tables 54a–54i extend from right wall 30 toward the longitudinal axis of enclosure 22. Each table 54a–54i is sufficiently spaced from adjacent tables so that emergency care providers may access a patient from both sides of each table 54a–54i. In one embodiment, a plurality of privacy curtains 56 are slidably mounted in tracks on the ceiling of enclosure 22 and may be drawn to provide privacy at an individual table.

The ends of treatment tables 54a–54i are spaced sufficiently from opposite wall 28 so that an access passageway 58 extends substantially along the length of enclosure 22. Second end 26 of enclosure 22 includes a doorway 60, and side wall 28 includes a second doorway 62 adjacent first end 24, so that a substantially unidirectional patient flow may be established by bringing a patient into facility 20 through one doorway, assigning the patient to a treatment table, and removing the patient from facility 20 through the other doorway. In one embodiment three windows 64, 66 and 68 are included on side wall 28 to provide light to the interior of enclosure 22 and to provide emergency exits. A door 70 is hingedly connected to doorway 60, and an air curtain 72 extends across doorway 60 to protect the interior of enclosure 22 when door 70 is opened. Similarly, a second door 74 is hingedly connected to doorway 62 and an air curtain 72 extends across doorway 62 to protect the interior of enclosure 22 when door 74 is opened. A ladder 78 (shown in FIG. 2) is hingedly mounted below each doorway 60 and 62 to facilitate ingress and egress from enclosure 22. Ladder 78 can be pivoted underneath enclosure 22, and latched during transportation and storage of facility 20. Doors 70 and 74 each have an upper knob 80 in a vertical position on the door convenient for someone standing on the level of the floor of enclosure 22, and a lower knob in a vertical position convenient for someone standing on the ground outside of enclosure 22.

Adjacent each treatment table 54a–54i is a supply storage cabinet, 84a–84i respectively. In alternate embodiments, additional storage may be provided in space below the treatment tables. Cabinets 84a–84i are used for pillows, blankets, linens, disposable gloves, bandages, cold packs, and the like. Some of treatment tables 54a–54i are provided with an EKG monitor 86. Adjacent second end 26 of enclosure 22 is an auxiliary storage cabinet 90 for storing additional medical supplies and equipment, such as needles, stethoscopes, flashlights and the like. The bottom of cabinets 84a–84i and 90 may be equipped with counterweights (not shown) for balancing the weight distribution when facility 20 is airlifted. A storage bay 92 is also positioned adjacent cabinet 90 and is provided for storing a machine such as an x-ray machine or a defibrillator.

Facility 20, also includes multiple water stations 94 provided along side wall 28, opposite wall 30 from which the treatment tables extend. Each water station 94 includes a counter top 96 with a basin 98. A removable, refillable water tank 100 is mounted above basin 98 to provide a gravity-fed water supply. Basin 98 drains to a removable drain container 102, which holds waste water and other liquid waste. Facility 20 therefore does not have to be connected to an external water supply or sewer. Removable solid waste containers 104 are also provided at each station 94 for holding solid waste.

A storage cabinet 106 is provided on wall 28 for holding addtional medical supplies and equipment, such as a portable X-ray machine and X-ray processor, portable EKG monitor, portable defibrillator, portable blood analyzer, or other similar equipment. A counter 108 with overhead storage cabinets 110 is also provided on wall 28.

Figure 4B:
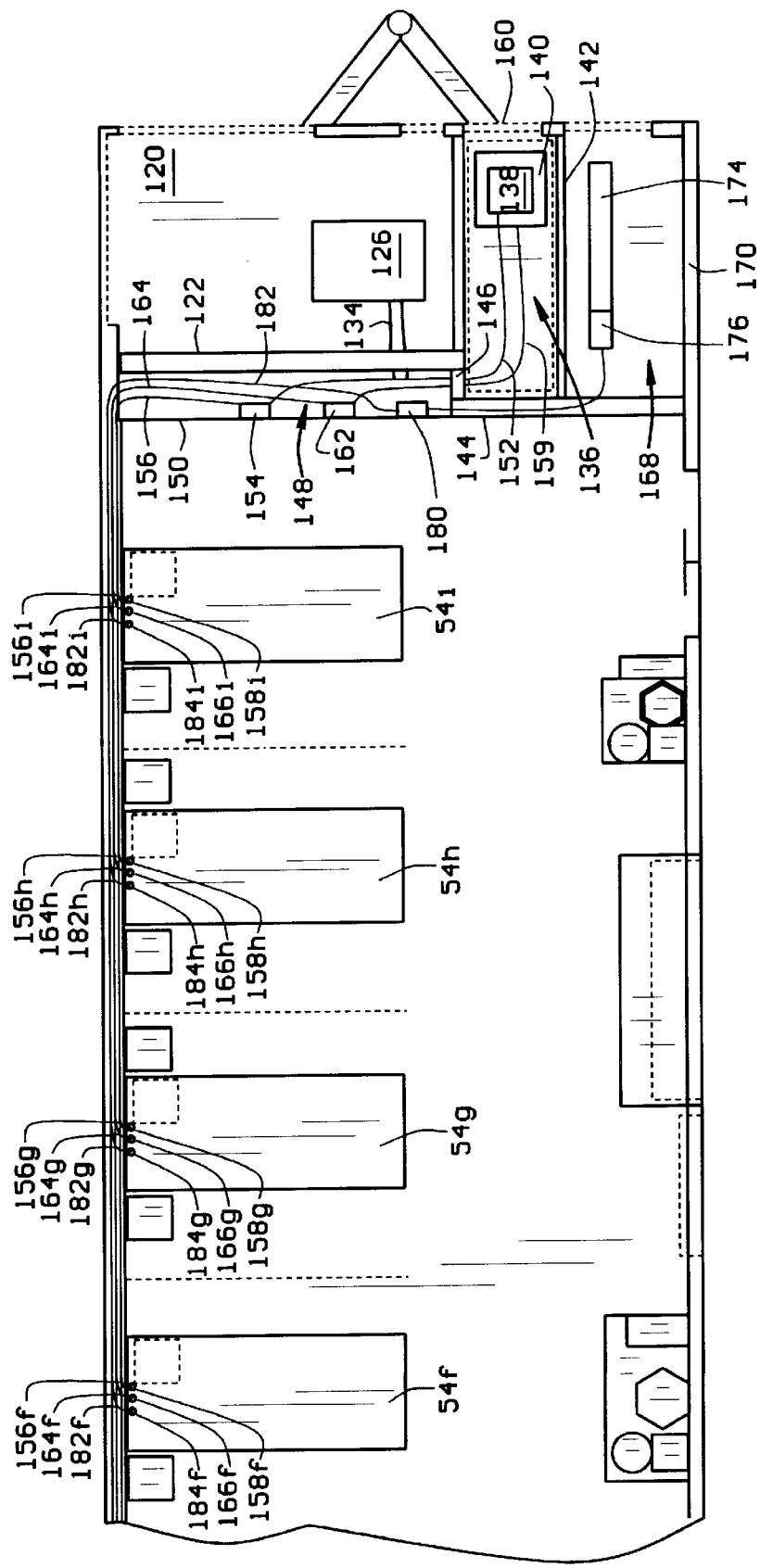
FIG. 4B is a top plan view of a front portion of the portable emergency care facility.

As shown in FIG. 4B, first end 24 includes multiple utility closets, including an electric generator closet 120 which is separated from the main part of enclosure 22 by fire walls 122 and 124. Closet 120 contains a diesel-powered electric generator 126 for generating electric power for facility 20 if a local source of power is not available. A switch (not shown) is provided so that generator 126 may be taken off line if the electrical system of facility 20 is connected to a local power source. Generator 126 is accessible through removable doors 128 and 130, and a removable access panel 132.

Electric air conditioner and heating units (not shown) are provided on top of enclosure 22 to maintain the interior of enclosure 22 at a temperature comfortable for patients and workers. For general lighting purposes, lights such as fluorescent or incandescent lights are provided (not shown) and may be mounted on the ceiling or interior walls of enclosure 22. Generator 126 is used for powering the medical equipment inside enclosure 22, and to power for lighting, heating, air conditioning and powering air curtains 72 and 76. A power cable 134 extends from generator 126 through fire wall 122. Multiple electric lines extend from the end of cable 134 along one side of fire wall 122, and then through the walls and ceiling of enclosure 22 to points within enclosure 22 where electric power is needed.

There is a utilities closet 136 adjacent the generator closet 120 for containing a compressor 138 and a vacuum pump 140, both powered by the generator 126, to provide compressed air and suction, respectively. The closet 136 is formed by walls 142, 144, and 146, and opens to a space 148 between an interior wall 150 and the fire wall 122. The interior of the utility closet 136 is accessible through a removable access panel 160 on the exterior of the enclosure. The compressor 138 is mounted in the closet 136 above the vacuum pump 140, and each is mounted on a sliding shelf to slide out of the closet for servicing. The compressor and pump can also be slid out of the closet while in use, if desired. A line 152 extends from the outlet of the compressor through the space 148 to a manifold and gauge 154 mounted on the wall 150. Separate lines 156a through 156i extend from the manifold and gauge unit 154 in the space 148 to the wall 30, and horizontally through the wall to outlets 158a through 158i, respectively, which are positioned on the wall 30, adjacent each of the treatment tables 54. Similarly, a line 160 extends from the outlet of the vacuum pump 138 through the space 148 to a manifold and gauge unit 162 mounted in the wall 150. Separate lines 164a through 164i, extend from the manifold 162 in the space 148 to the wall 30, and horizontally through the wall to outlets 166a through 166i, respectively, which are positioned on the wall 30, adjacent each of the treatment tables 54.

An oxygen closet 168 is located next to the utilities closet 136. The oxygen closet 168 is formed by wall 170, and the wall 142 which separates the oxygen closet from the utilities closet. The oxygen closet 168 is accessible through removable door 172, on the exterior of the enclosure. There are a plurality of oxygen tanks 174 inside the oxygen closet 168, each connected to a regulator and control valve 176. An oxygen line 178 extends from the regulator and control valve 176 to a manifold and monitor unit 180 mounted on the wall 150. Separate lines 182*a* through 182*i*, extend from the manifold and monitor unit 180 in the space 148 to the wall 30, and horizontally through the wall to outlets 184*a* through 184*i*, respectively, which are positioned on the wall 30, adjacent each of the treatment tables 54.

A perimeter lighting system 186 is provided at the roof line to make the emergency care facility 20 easy to locate, and to illuminate the vicinity of the emergency care facility. Thus, the portable emergency care facility provides a complete, self sufficient emergency care facility that can be transported to the site of need. The facility is ready to use with a minimum of preparation and set up. The facility provides for the efficient flow of patients through the facility. In contrast to existing ambulances, the facility can be used to provide critical care to multiple patients, and permits access to both sides of the patient. Privacy curtains can separate the patients on adjacent treatment tables.

Figure 7:
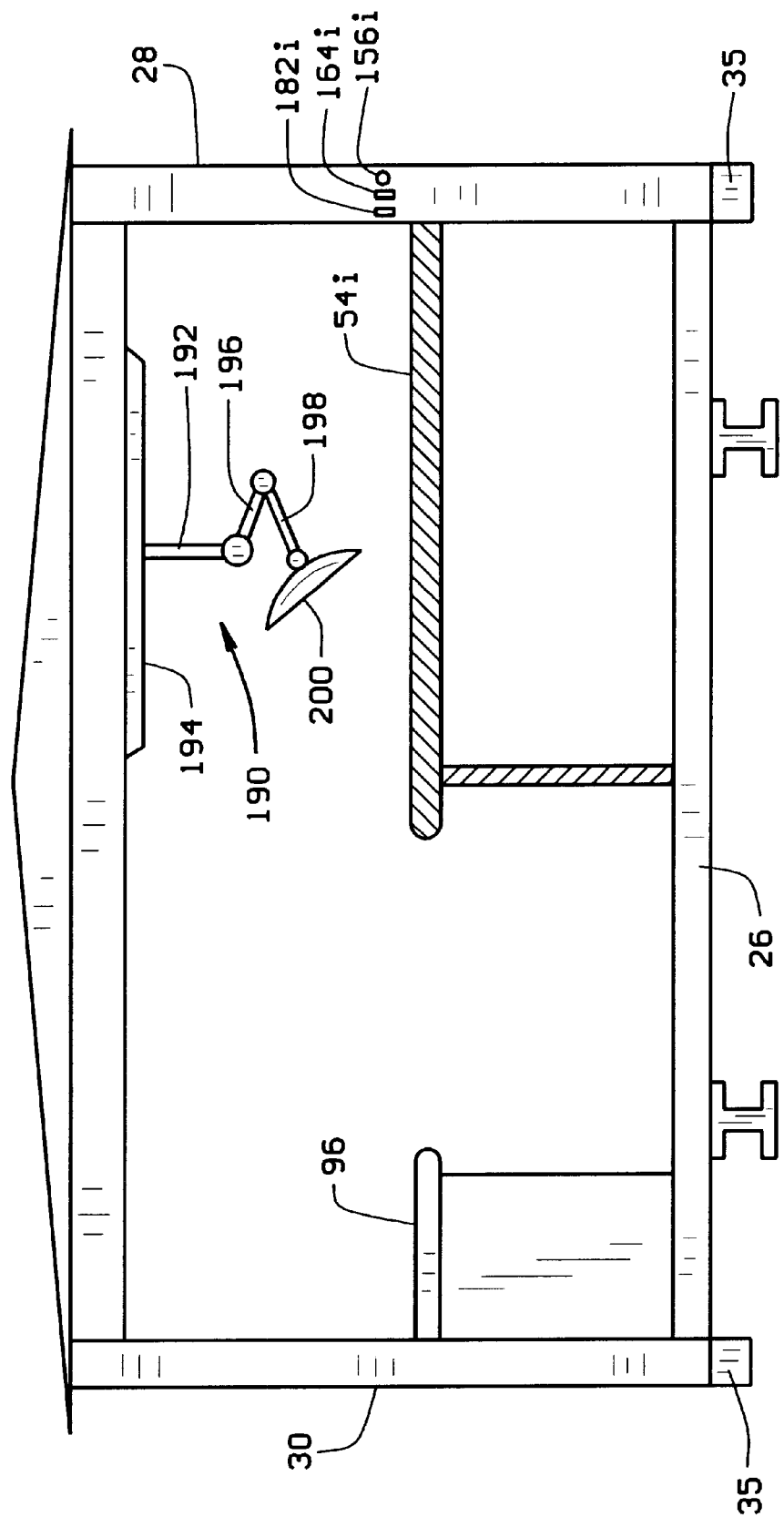
FIG. 7 is a cross-sectional view of the portable emergency care facility.

FIG. 7 is a cross-sectional view of facility 20 showing a ceiling-mounted surgical light 190 provided over treatment table 54*i*. Surgical light 190 is an adjustable surgical light as is well-known in the art, and provides a suitably bright, directed incandescent or halogen light source for use during emergency surgeries. For example, light 190 may include multiple incandescent or halogen light bulbs. Light 190 has a rating of about 200 to no more than about 500 Watts. Light 190 may additionally include filters and coatings as known in the art to keep the light beam cool. In one embodiment, light 190 includes a substantially vertical support member 192 mounted on a sliding member (not shown) which fits onto a ceiling-mounted track 194 which extends along the ceiling of enclosure 22 over bed 54*i* and substantially the length of bed 54*i*. In one embodiment, light 190 includes a first arm 196 pivotally connected to member 192, and a second arm 198 pivotally connected to first arm 196. A lamp 200, which includes light bulbs and a light reflector with a handle, is pivotally connected to second arm 198. Light 190 is thus substantially adjustable in three dimensions and may be conveniently positioned to direct light substantially anywhere along table 54*i*. In one embodiment, a second surgical light similar to light 190 is similarly mounted over table 54*a*. Alternatively, similar surgical lights may be mounted substantially anywhere within enclosure 22.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A portable emergency care facility comprising:
   an elongate enclosure having first and second ends and two opposing long walls extending between the first and second ends;
   a plurality of wheels on the enclosure to facilitate transporting the facility;
   a plurality of treatment tables extending from at least one of the long walls toward the center of the enclosure, each of the treatment tables being sufficiently spaced form the others to allow patient access on both sides of the treatment tables; and
   a surgical light mounted over at least one of said treatment tables.

2. The portable emergency care facility in accordance with claim 1 wherein said surgical light is slidably mounted over at least one of said treatment tables.

3. The portable emergency care facility in accordance with claim 1 wherein said surgical light comprises a plurality of pivotally connected supporting arms so that said surgical light may be adjusted to direct light substantially anywhere along said treatment table.

4. The portable emergency care facility in accordance with claim 1 further comprising a self-contained generator, and wherein said surgical light is electrically connected to said generator.

* * * * *